J. L. Ripley.
Hay Fork.

No. 44,116. Patented Sep. 6, 1864.

Witnesses:

Inventor:
John L. Ripley
Attorneys

UNITED STATES PATENT OFFICE.

JOHN L. RIPLEY, OF FREMONT, OHIO.

IMPROVEMENT IN HORSE HAY-FORKS.

Specification forming part of Letters Patent No. 44,116, dated September 6, 1864.

*To all whom it may concern:*

Be it known that I, JOHN L. RIPLEY, of Fremont, in the county of Sandusky and State of Ohio, have invented a new and Improved Horse Hay-Fork for Unloading Hay; and I do hereby declare that the following is a full, clear, and exact description thereof, which will enable others skilled in the art to make and use the same, reference being had to the accompanying drawings, forming part of this specification, in which—

Figure 1:
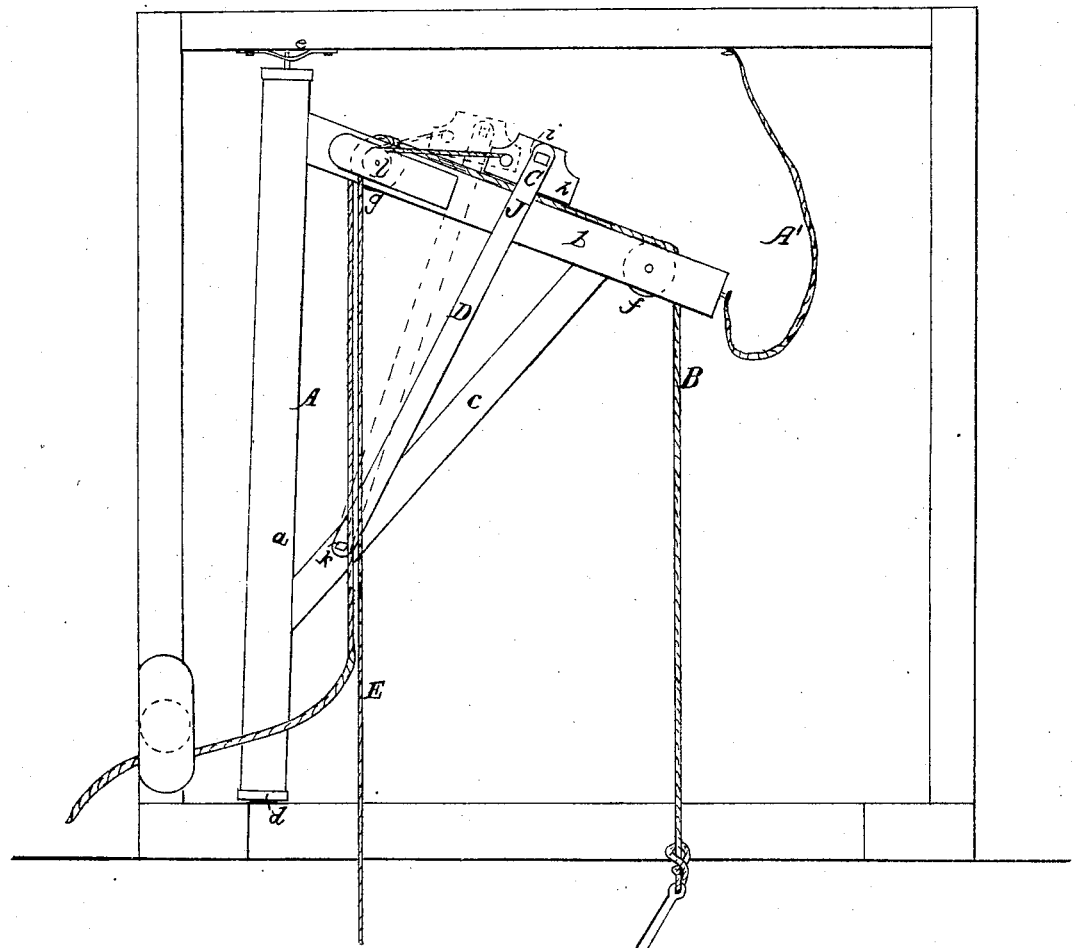
Figure 2:
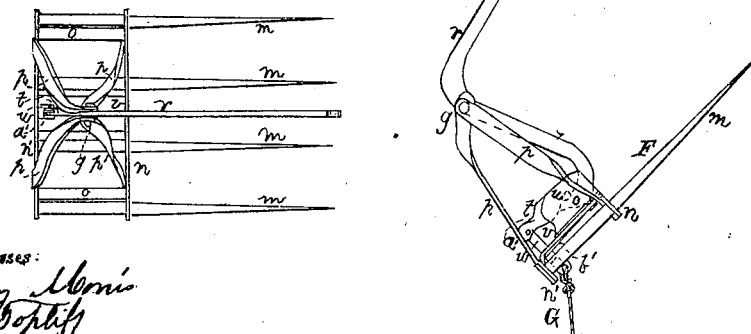

Figure 1 is an elevation of my invention; Fig. 2, a detached plan or top view of the fork.

Similar letters of reference indicate like parts.

This invention relates to a new and improved horse hay-fork, such as are used for elevating hay in barns, taking it from the loaded wagon or cart, and depositing it in the mow.

The invention consists in a novel construction of the fork, whereby the same may be economically constructed, and made to retain or hold its load while being elevated, and rendered capable of being loaded by the attendant with the greatest facility.

A represents a crane, which is composed of a main post, a, slightly inclined from a vertical position, a top beam, b, which is framed into the post a, and is inclined downward therefrom, and a brace, c, which is framed into a and b, as shown clearly in Fig. 1. This crane is fitted or hung in the upper part of the barn over one side of the passage-way below, into which the load of hay to be elevated is driven. The lower end of the post a is stepped into a beam, as shown at d, while the upper end of said post has its journal fitted in a suitable bearing, e.

In the beam b, near its outer end, there is fitted a pulley, f, and a similar pulley, g, is inserted in the inner part of said beam. The hoisting-rope B passes over these pulleys and through the beam b.

C represents a brake, which is composed of a block, h, placed on the top of the beam b, and secured by a bolt, i, between the arms j of a bar, D, the lower part of which is also forked, and secured by a bolt, k, to the lower part of the brace c. The block h works over the hoisting-rope B, and it has a rope, E, attached to it, which passes over a pulley, l, at the side of the beam b, and extends down within reach of the operator on the load. The hoisting-rope B extends down to the flooring of the barn, and passes underneath a pulley, and has the draft-animal attached to it, while the opposite end of said rope is attached to the fork F.

This fork is constructed as follows: The tines m are perfectly straight, and they may be round in their transverse section and tapered to a point. Four tines, m, are represented in Fig. 2; but there may be more or less of them, and they are fitted at their inner parts in two parallel bars, n n', secured at a proper distance apart by rods o o. The tines m pass snugly through holes in the bar n, and their inner ends are secured by riveting or otherwise in the bar n'.

To each bar n n' there are secured two bars, p. These bars all extend upward, and they have a bolt, q, passing through their upper ends, said bolt also passing through the arm r of the fork. This arm r is of bent or curved form, the lower part being about at right angles with the upper part, and the lower part is slightly curved backward, and is provided with a notched end, s, to catch under a notched arm, t, which is fitted between upright plates u u, attached to a horizontal plate, v, which is secured to the bars n n'. The back end of the arm t has a bar, u, attached to it by a joint, a', and this bar u is connected with a spring, b', secured to the under side of the plate v. A cord or rope, G, is attached to the lower end of the bar u.

The operation is as follows: The fork is elevated by the draft-animal, and as the fork ascends the crane A will, under the pull of the animal, project outward at right angles with the framing in which it is hung. Owing to the direction of the hoisting-rope B when the fork ascends, and the position of the bolt k of the bar D relatively with the beam b of the crane, the block h does not bind upon the rope B; but in case the horse slackens his speed, or casually backs, the fork is retained or held by the block h, which, by means of the reverse movement of the rope B, is made to bind upon the latter. In Fig. 1 the position of the block h when the fork is ascending is shown in red, and the position of the block when it clamps rope B is shown in black. When the fork has reached the desired height the horse is stopped, and, the pull being slackened, the weight of the loaded fork is retained by the crane A, which, in consequence of the inclination of the post a, will swing around over the mow. The attendant then pulls the cord or rope G, which causes the notched arm $t$ to release the lower end of the arm $r$, and the fork tilts and discharges its load. The attendant then pulls the rope E, which draws the crane around over the passage-way below, and at the same time releases the hoisting-rope B from the brake, and the empty fork is allowed to descend, the horse returning to his original starting position, either while attached to the rope B or detached from it, as the descent of the fork is fully under the control of the attendant who actuates the brake.

By having the tines $m$ made straight they may be readily forced into the hay, and the latter allowed to fall freely from the tines when the fork is tilted. The arm $r$ extends outward about as far as the tines, and consequently when the fork is being elevated the tines are inclined upward, so that the hay will not fall therefrom, and the arm $r$ is sufficiently far above the tines as not to interfere with the thrusting of the latter into the hay.

No handle is required for the fork, and the attendant, previous to shoving the tines into the hay, shoves forward the arm $r$, so that the lower end of the same will engage with the arm $t$, and the fork is again ready to be hoisted.

I would remark that a guy-rope, A*, is attached to the outer end of the beam $b$ to prevent the crane from swinging too far in either direction; and I would further remark that a spiral spring may be used instead of the spring $b'$.

I do not confine myself to any particular form of spring.

I claim as new and desire to secure by Letters Patent—

Fork F, constructed with straight tines $m$, a bent arm, $r$, fitted on a fulcrum-bolt, $q$, and a catch or fastening composed of the notched arm $t$ and the notched end $s$ of the arm $r$, bar $u$, and spring $b'$, all arranged substantially as and for the purpose specified.

JOHN L. RIPLEY.

Witnesses:
HIRAM W. BRISTOL,
FREDK. A. CURTIS.